United States Patent Office 2,825,730
Patented Mar. 4, 1958

2,825,730

ORGANIC COMPOUNDS

Edward A. Prill, Yonkers, N. Y., assignor to Boyce Thompson Institute for Plant Research, Inc., Yonkers, N. Y., a corporation of New York No Drawing. Application February 4, 1953
Serial No. 335,167

2 Claims. (Cl. 260—294)

This invention relates to organic compounds and has for its object the provision of a new class of organic compounds, and a method of producing the compounds. The compounds of the invention are represented by the formulas

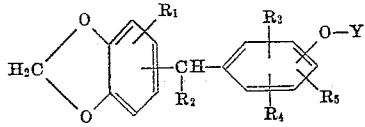

and

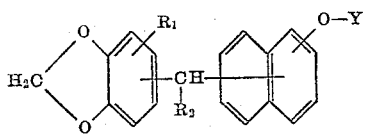

wherein $R_1$ and $R_2$ are members of the group consisting of the hydrogen atom and lower alkyl radicals; $R_3$, $R_4$, and $R_5$ are members of the group consisting of the hydrogen atom, the hydroxyl radical, aliphatic and alicyclic univalent hydrocarbon radicals both saturated and unsaturated and when unsaturated the unsaturated linkage is at least two carbon atoms from the point of attachment, and alkoxyl radicals; and Y is a member of the group consisting of the hydrogen atom, alkyl, cycloalkyl, aralkyl and alkenyl radicals, and such hydrocarbon radicals which are interrupted in at least one place by an ethereal oxygen atom between two carbon atoms, the cyanoethyl radical, carboxyalkyl radicals and esters, amides and N-substituted amides thereof; and in the formulas O—Y is in one of the positions ortho, para and amphi to the moiety containing the methylenedioxyphenyl nucleus.

The compounds are useful as intermediates for the production of insecticides, particularly the type of insecticides which act as synergists with pyrethrins, allethrin and structurally related insecticides. Some of the compounds, as is herein later pointed out, are per se active as insecticides. The compounds are also useful as germicides and surface active agents or intermediates for the production of germicides and surface active agents.

The compounds may be produced by the reaction of equimolar quantities of a halogen compound of the formula

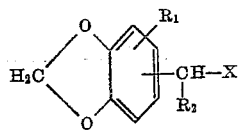

and a phenolic compound of the formula

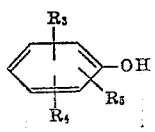

in which the benzene ring is unsubstituted in at least one of the positions ortho and para to a hydroxyl radical, alphanaphthol and beta-naphthol; and in the reaction an equimolar quantity of hydrogen halide is eliminated. The values of the R's are the same as previously defined and X is chlorine or bromine. When desired, the complex phenolic compound obtained in the above manner may be subjected to further reactions to yield products such as are described in the later examples.

The aforementioned halogen compounds may be any of the following: piperonyl chloride, isosafrole hydrochloride preparable by a method such as that of Prill—U. S. Patent 2,456,316, Example VII therein, the chloromethylation product of dihydrosafrole of the formula

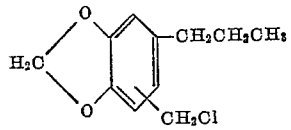

preparable according to Wachs U. S. Patent 2,485,681, and the similarly preparable chloromethylation products of other alkyl-methylenedioxybenzenes such as, for example, 3,4-methylene dioxytoluene; also the chloroethylation, chloropropylation, chlorobutylation products of methylenedioxybenzene, methylenedioxytoluene, dihydrosafrole and of other alkyl methylenedioxybenzenes.

The aforementioned phenolic compounds may be any of those used in the following specific examples and also 6-tert-butyl-m-cresol, p-tert.-butylphenol, p-tert.-amylphenol, p-(1,1,3,3-tetramethylbutyl)phenol, p-nonylphenol, m-pentadecylphenol, cardanol, thymol, carvacrol, o-isopropylphenol, o-methallylphenol, and the various cresols and xylenols.

The first 25 examples illustrate the production of complex phenolic compounds (Y is hydrogen). These compounds are not appreciably steam distillable and with few exceptions are soluble in 15% aqueous potassium hydroxide solution. The alkaline solutions usually froth when shaken. The few compounds that are not soluble in aqueous potassium hydroxide solution have a rather large accumulation of aliphatic hydrocarbon structure represented by $R_3$, $R_4$, and $R_5$ and from the known behavior of comparable high molecular weight phenols would not be expected to be soluble in the alkali. The condensations take place more readily through the para than the ortho position of the phenolic compound. However, where the phenolic compound used has both ortho and para positions available, it is likely that some condensation will take place through the ortho position as well as through the para position so that as a result a mixture of isomers is obtained. Consequently in the examples where a product is purified and a property of the purified material, such as its melting point, is given, this property may be that of a more abundant isomer or it may be that of a not easily separable mixture. The reaction between the halogen compound of the type herein specified and a phenolic compound takes place under relatively mild conditions as contrasted, for example, with the reaction of benzyl chloride with phenol to produce benzylphenol. Drastic conditions such as required in the latter case (high temperature together with an acidic catalyst) would be very destructive to compounds containing the methylenedioxyphenyl nucleus.

The following general method was found applicable in each case for the reaction of the phenolic compound with the halogen compound. To about 0.4 mole of the phenolic compound (the phenolic compound was dissolved in an inert solvent such as benzene or dioxane in case it was solid, otherwise no solvent was needed) maintained at about room temperature there was slowly added while stirring about 0.2 mole of the halogen compound at such a rate that there was no appreciable rise in temperature. Hydrogen halide gas was evolved in each case. The reaction mixture was allowed to stand until the next day to insure completion of the reaction. The reaction mixture was then subjected to steam distillation in order to remove the excess phenolic compound which had been used as starting material or other volatile impurities. The water-soluble residue comprised the desired compound. In a few cases, namely, where p-tert.-butylcatechol or a naphthol had been used the excesses of these phenolic starting materials were removed by washing out with warm water. Only in a few cases was it necessary to remove an alkali-insoluble impurity by dissolving the compound in 15% aqueous KOH, filtering and reprecipitating the compound with a mineral acid. The compounds were in some cases further purified by distillation or crystallization.

In these examples a liberal excess of the phenolic reactant had been used. The method of producing the compound is also operative when no excess of the phenolic reactant is used.

The examples covering these compounds are listed in Tables 1, 2 and 3. The formula of the more probable isomer is indicated in each case. When determined, the approximate (ca.) melting point (M. P.) and the boiling point (B. P.) at the millimeters (mm.) of mercury pressure are indicated under characteristics of the compound.

*Table 1*

Compounds prepared from isosafrole hydrochloride and which have the formula

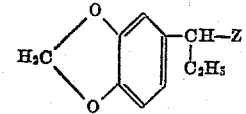

| Example No. | Phenolic compound used as reactant | Compound where —Z is— | Solvent used in reaction | Compound soluble in 15% aqueous KOH | Characteristics of the compound |
|---|---|---|---|---|---|
| 1 | Phenol | ⌬—OH | Benzene | Yes | Viscous liquid, B. P. ca. 180° C./2 mm. |
| 2 | p-cresol | ⌬—CH₃, OH | None | Yes | Viscous liquid, B. P. ca. 165°–170° C./2 mm. |
| 3 | m-cresol | ⌬—OH, CH₃ | ---do--- | Yes | Viscous liquid, B. P. ca. 190°–195° C./2 mm. |
| 4 | Guiacol | ⌬—OH, OCH₃ | ---do--- | Yes | Viscous liquid. |
| 5 | Resorcinol monomethyl-ether. | ⌬—OH, OCH₃ | ---do--- | Yes | Viscous liquid, B. P. ca. 185°–190° C./2 mm. |
| 6 | o-Allylphenol. | ⌬—OH, CH₂—CH=CH₂ | ---do--- | Yes | Viscous liquid which is soluble in ligroin. |
| 7 | Resorcinol | ⌬—OH, OH | Benzene | Yes | Viscous liquid. |
| 8 | Catechol | ⌬—OH, OH | ---do--- | Yes | Do. |
| 9 | p-tert.-butyl-catechol. | ⌬—OH, OH, C(CH₃)₃ | ---do--- | Yes | Do. |
| 10 | Pyrogallol | ⌬—OH, OH, OH | ---do--- | Yes | Do. |
| 11 | o-cyclohexylphenol. | ⌬—OH, C₆H₁₁ | Dioxane | No | Viscous oil which is soluble in ligroin. |

Table 1.—Continued

| Example No. | Phenolic compound used as reactant | Compound where —Z is— | Solvent used in reaction | Compound soluble in 15% aqueous KOH | Characteristics of the compound |
|---|---|---|---|---|---|
| 12 | 2,5-dimethylphenol | (2,5-dimethyl phenol with CH₃ groups and OH) | do | Yes | Viscous oil, B. P. ca. 190–195° C./2 mm. |
| 13 | α-naphthol | (α-naphthol structure with OH) | do | Yes | Viscous oil. |
| 14 | β-naphthol | Probably (β-naphthol structure with OH) and (isomeric naphthol structure with OH) | do | Yes | Solid crystallized from benzene plus ligroin. Fraction A, M. P. ca. 114° C. Fraction B, M. P. ca. 118° C. |

Table 2

Compounds prepared from piperonyl chloride and which have the formula

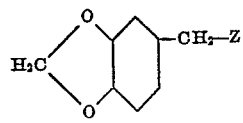

| Example No. | Phenolic compound used as reactant | Compound where —Z is— | Solvent used in reaction | Compound soluble in 15% aqueous KOH | Characteristics of the compound |
|---|---|---|---|---|---|
| 15 | Phenol | (phenyl-OH, para) | Benzene | Yes | Viscous liquid which solidified. Crystallization from a large volume of water gave satiny crystals having M. P. ca. 70° C. |
| 16 | p-cresol | (phenyl with CH₃ and OH) | None | Yes | Viscous liquid which solidified. Recrystallization from benzene gave crystals having M. P. of ca. 66° C. |
| 17 | p-tert.-butylphenol | (phenyl with C(CH₃)₃ and OH) | Benzene | Yes | Viscous liquid. |
| 18 | 2,6-diallylphenol | (phenyl with CH₂—CH=CH₂ groups and OH) | None | No | Viscous liquid which is soluble in ligroin. |

Table 2.—Continued

| Example No. | Phenolic compound used as reactant | Compound where —Z is— | Solvent used in reaction | Compound soluble in 15% aqueous KOH | Characteristics of the compound |
|---|---|---|---|---|---|
| 19 | 3,5-dimethylphenol | (3,5-dimethylphenol with —OH) | Benzene | Yes | Viscous liquid, B. P. ca. 175°–180° C./2 mm. |
| 20 | α-naphthol | (α-naphthol —OH) | Dioxane | Yes | Viscous liquid which solidified. Recrystallization from benzene gave crystals having M. P. ca. 134° C. |
| 21 | β-naphthol | Probably (β-naphthol —OH) or (OH naphthol) | do | Yes | Crystals from benzene. M. P. ca. 120°–122° C. |

Table 3

Compounds prepared from the chloromethylation product of dihydrosafrole and which have the formula

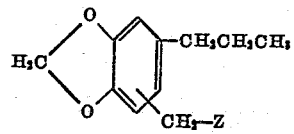

| Example No. | Phenolic compound used as reactant | Compound where—Z is— | Solvent used in reaction | Compound soluble in 15% aqueous KOH | Characteristics of the compound |
|---|---|---|---|---|---|
| 22 | Phenol | (—OH) | Benzene | Yes | Viscous liquid. B. P. ca. 180°–182° C./2 mm. |
| 23 | m-cresol | (CH₃ —OH) | None | Yes | Viscous liquid. |
| 24 | 3,5-dimethylphenol | (3,5-dimethyl —OH) | Benzene | Yes | Solid. Recrystallization from ligroin gave crystals having M. P. ca. 93°–97° C. |
| 25 | β-naphthol | (β-naphthol —OH) or (OH naphthol) | Dioxane | Yes | Solid. Recrystallization from benzene gave crystals having M. P. ca. 122°–125° C. |

A number of derived compounds were prepared from the compound of Example 1. These correspond to the formula

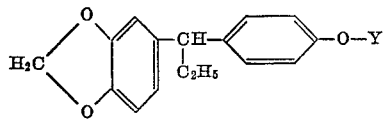

and the individual values of Y are indicated in the following examples.

EXAMPLE 26.—Y is $CH_3$

The compound of Example 1 in aqueous KOH solution was methylated with methyl sulfate. The new compound separated out from the alkaline solution as a viscous oil.

EXAMPLE 27.—Y is $CH_2-CH=CH_3$

The compound of Example 1 in acetone solution was refluxed with an excess of allyl bromide and anhydrous potassium carbonate for about 16 hours. The new compound was isolated as an oily liquid which was not soluble in aqueous alkali.

EXAMPLE 28.—
Y is $CH_2CH_2-O-CH_2CH_2-O-CH_2CH_2CH_2CH_3$

To 50 ml. of absolute ethyl alcohol there was added 1.2 g. of metallic sodium and after it had dissolved there was added 13 g. of the compound of Example 1 followed by 10 g. of 2-(2-butoxyethoxy)ethyl chloride. The mixture was refluxed for about 12 hours, then aqueous KOH solution and water were added and the new compound extracted with ethyl ether. The new compound is an oily liquid.

EXAMPLE 29.—Y is $n-C_8H_{17}$

This was prepared by the alkylation of the compound of Example 1 with n-octyl bromide and metallic sodium dissolved in absolute ethyl alcohol by the method similar to that used in Example 28. The new compound is an oily liquid which is readily soluble in petroleum ether.

EXAMPLE 30.—Y is $CH_2CH_2CN$

To 16 g. of the compound of Example 1 in dioxane solution there was added 0.5 ml. of 40% benzyltrimethylammonium hydroxide followed by the slow addition of 10 ml. of acrylonitrile while keeping the temperature below 40° C. After standing at room temperature for several hours, the reaction mixture was greatly diluted with water and the new compound extracted out with benzene. The new compound is a very viscous gummy substance.

EXAMPLE 31.—Y is $CH_2COOH$

To 200 ml. of absolute ethyl alcohol there was added 13.2 g. of metallic sodium and after this had dissolved there was added 135 g. of the compound of Example 1 followed by 86 g. of ethyl chloroacetate. The mixture was refluxed until neutral (about 4 hours). Then aqueous sodium hydroxide solution in an amount more than sufficient to hydrolyze the ethyl ester of the new compound was added and the mixture again refluxed. After completion of the hydrolysis the mixture was greatly diluted with water and made acid to Congo-red indicator with hydrochloric acid. The crude product precipitated as an oily layer. The supernatant aqueous-alcohol layer was discarded and the oily layer stirred with ethyl ether. A fraction of the crude product dissolved in the ethyl ether while the other fraction turned solid and did not dissolve in ethyl ether.

The fraction soluble in ethyl ether was isolated and recrystallized from a mixture of toluene and petroleum ether. It had a melting point of about 115°–116° C. The found neutral equivalent was 310 which agrees well with the calculated value of 314.3. This is, therefore, the desired compound.

The solid fraction after recrystallization from toluene had a melting point of about 161°–163° C. Its neutral equivalent was found to be about 611. It appears to be a more or less stable combination consisting of one molecule of the desired compound of this Example 31 with one molecule of the compound of Example 1. However, I offer this merely as a plausible possibility.

The compound of Example 31, which is an organic acid, was converted into various of its N-substituted amides by first converting the organic acid to its acid chloride by means of thionyl chloride and then allowing the acid chloride to react with an excess of an amine in benzene solution. The benzene solution was washed with dilute hydrochloric acid and then with dilute sodium hydroxide solution after which the solvent was evaporated leaving the N-substituted amide as the residue. Unless otherwise indicated, these amides were very viscous liquids. They are listed in Table 4.

Table 4
N-SUBSTITUTED AMIDES OF THE ACIDIC COMPOUND OF EXAMPLE 31

| Example No. | N-Substituted Amide of the Acidic Compound of Example 31 | Amine Used in Production | Remarks |
|---|---|---|---|
| 32 | N-(2-ethylhexyl)amide. | 2-ethylhexylamine | |
| 33 | N-cyclohexylamide | Cyclohexylamine | |
| 34 | N-n-hexylamide | n-hexylamine | Crystals from benzene+petroleum ether. M. P. 46°–49° C. |
| 35 | N-(3,5,5-trimethylhexyl)amide. | 3,5,5-trimethylhexylamine. | |
| 36 | N,N-di-n-butylamide. | di-n-butylamine | |
| 37 | N,N-di-isopropylamide. | di-isopropylamine | |
| 38 | Piperidide | Piperidine | |
| 39 | N-(3-isopropoxypropyl)amide. | 3-isopropoxypropylamine. | |
| 40 | N-(α-methylbenzyl)amide. | α-methylbenzylamine. | |

The compounds of Examples 26 to 40 are derived primarily from the compound of Example 1. By similar reactions many other similar compounds may be prepared from each of the compounds of Examples 1 to 25.

Some of the compounds of the latter examples were tested as insecticides in combination with pyrethrins or allethrin by the Large Group Peet-Grady method ("Blue Book," pp. 171–181. MacNair-Dorland Co., New York, 1939) against house flies. The Official Test Insecticide (OTI) contains 100 mg. pyrethrins per 100 ml. The test solutions were made up in a solvent consisting of 95% deodorized petroleum distillate and 5% acetone. The results of the tests are given in Table 5. The 10 minute knockdowns were all over 90%.

Table 5
RESULTS OF PEET-GRADY TESTS

| Compound of Example No. | Formulation, mg. per 100 ml. | | | Percent Kill in 24 hrs. | |
|---|---|---|---|---|---|
| | Compound | Pyrethrins | Allethrin | Formulation | OTI |
| | | 70 | | 23.7 | 41.0 |
| | | | 100 | 20.6 | 41.0 |
| 26 | 1,000 | | 50 | 44.6 | 38.1 |
| 27 | 2,000 | 35 | | 55.8 | 40.0 |
| 28 | 1,000 | 35 | | 76.0 | 40.0 |
| | 1,000 | | 50 | 53.5 | 38.1 |
| 32 | 400 | 35 | | 91.0 | 50.5 |
| | 400 | | 50 | 54.5 | 50.5 |
| 33 | 400 | | 50 | 48.0 | 50.5 |
| 34 | 400 | 35 | | 89.0 | 50.5 |
| | 400 | | 50 | 56.5 | 50.5 |
| 36 | 400 | 35 | | 83.3 | 38.1 |
| | 400 | | 50 | 68.8 | 38.1 |
| 37 | 400 | 35 | | 92.4 | 55.6 |
| | 400 | | 50 | 66.4 | 55.6 |
| 38 | 400 | 35 | | 73.6 | 47.1 |
| 39 | 400 | 35 | | 93.2 | 55.6 |
| | 400 | | 50 | 70.5 | 55.6 |
| 40 | 400 | 35 | | 71.8 | 42.1 |
| | 400 | | 50 | 67.1 | 42.1 |

The N-substituted amides of the invention are particularly active as insecticides and as synergists or extenders for pyrethrins and allethrin. They would be expected to also be synergists or extenders for other structurally related insecticides, such as, for example, furethrin. For the Peet-Grady tests the compounds were formulated with a petroleum distillate as the carrier. The compounds may also be formulated with other carriers, such as an aerosol or as impregnated on finely divided solid matter without loss of insecticidal power.

I claim:

1. The compounds represented by the formula

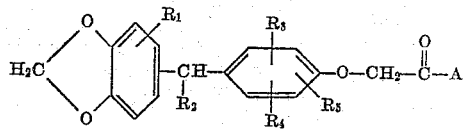

wherein $R_1$ and $R_2$ are members of the group consisting of hydrogen and lower alkyl radicals; $R_3$, $R_4$, and $R_5$ are members of the group consisting of hydrogen, the methoxy radical, the allyl radical and alkyl radicals containing not more than 9 carbon atoms and A represents a member of the group consisting of the hydroxy radical, a lower alkoxy radical, and a radical remaining after removal of a single hydrogen atom from its attachment to nitrogen of a monoamine containing not more than 10 carbon atoms consisting of a monoalkylamine, a dialkylamine, a monoaralkylamine, a mono(alkoxyalkyl)-amine, cyclohexylamine and piperidine.

2. The compound of the formula

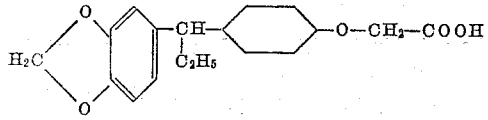

References Cited in the file of this patent

UNITED STATES PATENTS 2,485,680   Wachs _____ Oct. 25, 1949

OTHER REFERENCES

Beilstein Handbuch der Organischen Chemie, Vierte Auflange, vol. 19, page 644 (1934).

Hickinbottom—"Reactions of Organic Compounds," Longmans, Green & Co. (1948), pages 93, 94.

Brown, Insect Control by Chemicals, John Wiley & Sons, New York (1951), pages 26–27, 297, 299, 300.

UNITED STATES PATENT OFFICE
Certificate of Correction

Patent No. 2,825,730

March 4, 1958

Edward A. Prill

It is hereby certified that error appears in the printed specification of the above numbered patent requiring correction and that the said Letters Patent should read as corrected below.

Column 12, lines 8 to 13, claim 2, the formula should appear as shown below instead of as in the patent—

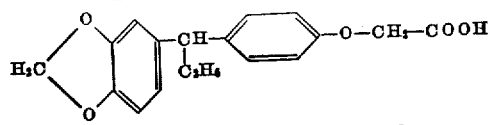

Signed and sealed this 20th day of May 1958.

[SEAL]

Attest:
KARL H. AXLINE,
Attesting Officer.

ROBERT C. WATSON,
Commissioner of Patents.